(12) United States Patent
Guy

(10) Patent No.: US 11,808,415 B2
(45) Date of Patent: *Nov. 7, 2023

(54) ELECTROMAGNETIC RADIATION COLLECTING AND DIRECTING DEVICE

(71) Applicant: Frederick Guy, Syracuse, NY (US)

(72) Inventor: Frederick Guy, Syracuse, NY (US)

(73) Assignee: Frederick R. Guy

( * ) Notice: Subject to any disclaimer, the term of this patent is extended or adjusted under 35 U.S.C. 154(b) by 6 days.

This patent is subject to a terminal disclaimer.

(21) Appl. No.: 17/197,825

(22) Filed: Mar. 10, 2021

(65) Prior Publication Data

US 2021/0215312 A1    Jul. 15, 2021

Related U.S. Application Data

(63) Continuation of application No. 16/824,184, filed on Mar. 19, 2020, now Pat. No. 10,962,186, which is a continuation of application No. 16/360,930, filed on Mar. 21, 2019, now Pat. No. 10,598,324.

(51) Int. Cl.
| | | |
|---|---|---|
| *F21S 11/00* | (2006.01) | |
| *F24S 20/60* | (2018.01) | |
| *F24S 20/61* | (2018.01) | |
| *F21V 7/06* | (2006.01) | |
| *F24S 60/00* | (2018.01) | |

(Continued)

(52) U.S. Cl.
CPC ............... *F21S 11/007* (2013.01); *F21V 7/06* (2013.01); *F24S 20/60* (2018.05); *F24S 20/61* (2018.05); *F24S 23/71* (2018.05); *F24S 60/00* (2018.05); *G02B 7/183* (2013.01)

(58) Field of Classification Search
CPC .......... F21S 11/007; F24S 23/71; F24S 20/60; F24S 20/61; F24S 60/00; F21V 7/06; G02B 7/183
USPC ........................................................ 359/597
See application file for complete search history.

(56) References Cited

U.S. PATENT DOCUMENTS

| | | | | |
|---|---|---|---|---|
| 4,026,267 A | * | 5/1977 | Coleman ................. | F24S 23/30 136/246 |
| 4,141,498 A | * | 2/1979 | Marschner ............. | A01G 9/243 165/45 |

(Continued)

FOREIGN PATENT DOCUMENTS

| | | |
|---|---|---|
| AT | 5285 B | 9/1901 |
| CN | 104944488 A | 9/2015 |

(Continued)

OTHER PUBLICATIONS

Graham-Rowe, "Solar-Powered Laser", Sep. 19, 2007, pp. 1-3.

(Continued)

*Primary Examiner* — Stephanie E Bloss
*Assistant Examiner* — Kevin C Butler
(74) *Attorney, Agent, or Firm* — Eschweiler & Potashnik, LLC

(57) ABSTRACT

An electromagnetic radiation collecting and directing apparatus is described herein. The electromagnetic radiation collecting and directing apparatus facilitates directing light from an exterior of a structure to an interior of a structure. The directed light is then distributed as necessary within the structure for heating, illumination, or is stored for use at a later time.

22 Claims, 7 Drawing Sheets

(51) Int. Cl.
   *G02B 7/183* (2021.01)
   *F24S 23/71* (2018.01)

(56) References Cited

U.S. PATENT DOCUMENTS

| | | | | |
|---|---|---|---|---|
| 4,297,000 A * | 10/1981 | Fries | ............. | F21S 11/00 353/3 |
| 4,306,769 A * | 12/1981 | Martinet | ............. | F21S 11/00 359/597 |
| 4,349,245 A | 9/1982 | Kliman | | |
| 4,411,490 A * | 10/1983 | Daniel | ............. | H01L 31/0547 136/246 |
| 4,706,471 A * | 11/1987 | Alexander | ............. | F24F 5/0046 62/235.1 |
| 4,720,170 A * | 1/1988 | Learn, Jr. | ............. | F24S 40/55 359/597 |
| 5,195,503 A | 3/1993 | Ludlow | | |
| 6,341,041 B1 * | 1/2002 | Carlson | ............. | F21S 11/00 359/597 |
| 6,381,070 B1 | 4/2002 | Cheng | | |
| 6,623,137 B1 | 9/2003 | Marsonette | | |
| 6,840,645 B2 * | 1/2005 | Eisenman | ............. | F21S 19/005 359/591 |
| 7,339,739 B1 * | 3/2008 | Kinney | ............. | G02B 19/0042 359/597 |
| 8,184,372 B1 * | 5/2012 | Gu | ............. | G01S 3/7861 359/597 |
| 8,578,650 B2 * | 11/2013 | Myntti | ............. | F24S 90/00 47/17 |
| 9,025,249 B2 * | 5/2015 | Maxey | ............. | F21S 11/005 359/597 |
| 9,052,452 B2 * | 6/2015 | Maxey | ............. | G02B 7/24 |
| 9,882,079 B2 | 1/2018 | Hernandez | | |
| 10,598,324 B1 | 3/2020 | Guy | | |
| 10,962,186 B2 | 3/2021 | Guy | | |
| 2002/0085393 A1 * | 7/2002 | Eisenman | ............. | G02B 6/0096 362/228 |
| 2004/0246596 A1 * | 12/2004 | Dyson | ............. | G02B 3/08 359/742 |
| 2009/0260619 A1 * | 10/2009 | Bailey | ............. | F24S 30/452 353/3 |
| 2009/0277494 A1 * | 11/2009 | Mazzer | ............. | H01L 31/0547 136/246 |
| 2010/0254010 A1 * | 10/2010 | Whitehead | ............. | F24S 23/79 359/597 |
| 2011/0030672 A1 | 2/2011 | Olsson | | |
| 2011/0100456 A1 * | 5/2011 | Walden | ............. | F24S 50/20 136/259 |
| 2013/0037018 A1 * | 2/2013 | Yu | ............. | F24S 30/40 126/685 |
| 2014/0251315 A1 * | 9/2014 | Patwardhan | ............. | F24S 50/20 126/714 |
| 2018/0119911 A1 | 5/2018 | Bitterman et al. | | |

FOREIGN PATENT DOCUMENTS

| | | |
|---|---|---|
| GB | 2029883 A | 3/1980 |
| GB | 1585916 A | 3/1981 |
| GB | 2563383 A | 12/2018 |
| KR | 20040019444 A | 3/2004 |
| KR | 100923544 B1 | 10/2009 |
| KR | 20130067861 A | 6/2013 |

OTHER PUBLICATIONS

Weiss, "Soaking Up Rays", Science News, Aug. 4, 2001, p. 77, vol. 160, No. 5.
Rohr, Bruce, "The Promise of Small Heliostats", In Northeast Sun, Spring 2009, pp. 7-12.
Bache, Rene, "Harnessing the Sun", Popular Mechanics, Apr. 1928, pp. 602-607.
Espacenet machine translation of CN 104944488 (6 pages).
Lin, Yu-Zheng & Fu, Yu-Ting & Chan, Kai-Chun & Lin, Chia-Ming & Chen, Hhi-Chi & Whang, Allen, Heliostat for Natural Light Illumination System, NSRRC, Oct. 2016, 3 pgs (Year: 2016).
Yusie Rizal et al, Application of solar position algorithm for sun-tracking system, Elsevier, International Conference on Sustainable Energy Engineering and Application (ICSEEA) 2012, pp. 160-165 (Year: 2012).
Iulia Stamatescu et al, Design and Implementation of a Solar-Tracking Algorithm, Elsevier, 24th DAAAM International Symposium, 2013 pp. 500-507 (Year: 2013).
Parthipan. J et al., Design of one axis three position solar tracking system for paraboloidal dish solar collector, 2015 Elsevier Ltd.All rights reserved, 8 pgs (Year: 2015).
Ibrahim Reda, Solar position algorithm for solar radiation applications, Elsevier, Jul. 28, 2003, 13 pages (Year: 2003).
Hassan Fathabadi, Comparative study between two novel sensorless and sensor based dualaxis solar trackers, Elsevier, Solar Energy 138, 2016, pp. 67-76 (Year: 2016).
Butler, Kevin C., "Non-Final Office Action for U.S. Appl. No. 16/360,930", dated Jun. 27, 2019, 11 pages.
Butler, Kevin C., "Notice of Allowance and Fees Due for U.S. Appl. No. 16/360,930", dated Jan. 23, 2020, 8 pages.
Butler, Kevin C., "Non-Final Office Action for U.S. Appl. No. 16/824,184", dated May 5, 2020, 11 pages.
Young, Lee, "International Search Report and Written Opinion for PCT Patent Application No. PCT/US20/23665", dated Jul. 28, 2020, 13 pages.
Butler, Kevin C., "Notice of Allowance and Fees Due for U.S. Appl. No. 16/824,184", dated Oct. 8, 2020, 8 pages.
Butler, Kevin C., "Supplemental Notice of Allowability for U.S. Appl. No. 16/824,184", dated Dec. 4, 2020, 2 pages.
Butler, Kevin C., "Response to Amendment Under Rule 312 for U.S. Appl. No. 16/824,184", dated Feb. 24, 2021, 2 pages.

* cited by examiner

ELECTROMAGNETIC RADIATION COLLECTING AND DIRECTING DEVICE

CROSS-REFERENCE TO RELATED APPLICATIONS

This application is a continuation of U.S. application Ser. No. 16/824,184, filed Mar. 19, 2020, which in turn is a continuation of U.S. application Ser. No. 16/360,930, filed Mar. 21, 2019, now U.S. Pat. No. 10,598,324. The entirety of these prior applications are incorporated herein by reference.

FIELD

The present disclosure relates generally to directing electromagnetic radiation into and through a structure. More specifically, the present disclosure relates to directing light-energy to illuminate and heat up parts of a structure.

BACKGROUND

Most modern buildings are equipped with methods of lighting and methods of heating a premises where there is either a lack of light or a lack of heat. For instance, if it is evening and the sun is positioned in the West such that a room positioned on the east side of a building is not receiving an ample amount of natural light or heat, more light or heat is required to the room. In another example, a building may contain rooms that do not have any windows to receive natural light at all, such as rooms in the center of a building, and thus require alternative methods of receiving light. Both lighting and heating methods have associated monetary costs in the form of either an electric bill or a gas bill reflective of how much lighting and/or heating is used in a specific time frame. Thus, it is desirable to have a means to direct electromagnetic radiation (e.g. light and heat) to an area of a structure such that costs associated with maintaining light and heat are minimized.

SUMMARY

The following is a brief summary of subject matter that is described in greater detail herein. This summary is not intended to be limiting as to the scope of the claims.

In an embodiment, an electromagnetic radiation collecting and directing apparatus comprises at least one heliostat with a reflective surface; a propagating medium which at least partially extends into a structure, wherein the propagating medium comprises a first end and a second end; an optical device associated with the propagating medium; and a controller. The first end is configured to receive electromagnetic radiation from the at least one heliostat or the optical device. The optical device is configured to direct the received electromagnetic radiation through the propagation medium. The second end is configured to allow the received electromagnetic radiation to exit the propagating medium. The controller is configured to control the direction and amount of the received electromagnetic radiation via at least one of user input or sensor input.

In an embodiment, a method of directing electromagnetic radiation includes the steps of: directing electromagnetic radiation into a first end of a propagating medium via at least one heliostat, wherein the first end receives the electromagnetic radiation; receiving a demand for heat or electromagnetic radiation from an electronic controller; in response to receiving the demand for heat or electromagnetic radiation from the electronic controller, directing the electromagnetic radiation received from the first end through an interior of the propagating medium to a second end of the propagating medium; and an interior of a structure receiving the electromagnetic radiation from the second end of the hollow shaft or a thermal energy storage device receiving the electromagnetic radiation from the second end of the propagating medium.

In an embodiment, a structure includes: at least one heliostat positioned at a distance away from the structure, wherein the heliostat comprises a reflective surface; a propagating medium which at least partially extends into the structure, wherein the propagating medium comprises a first end and a second end; an optical device associated with the propagating medium. The first end is configured to receive electromagnetic radiation from the at least one heliostat or the optical device. The optical device is configured to direct the received electromagnetic radiation through the propagating medium. The second end is configured to allow the received electromagnetic radiation into the structure. Also, a controller is configured to control the direction and amount of the received electromagnetic radiation via at least one of user input or sensor input.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
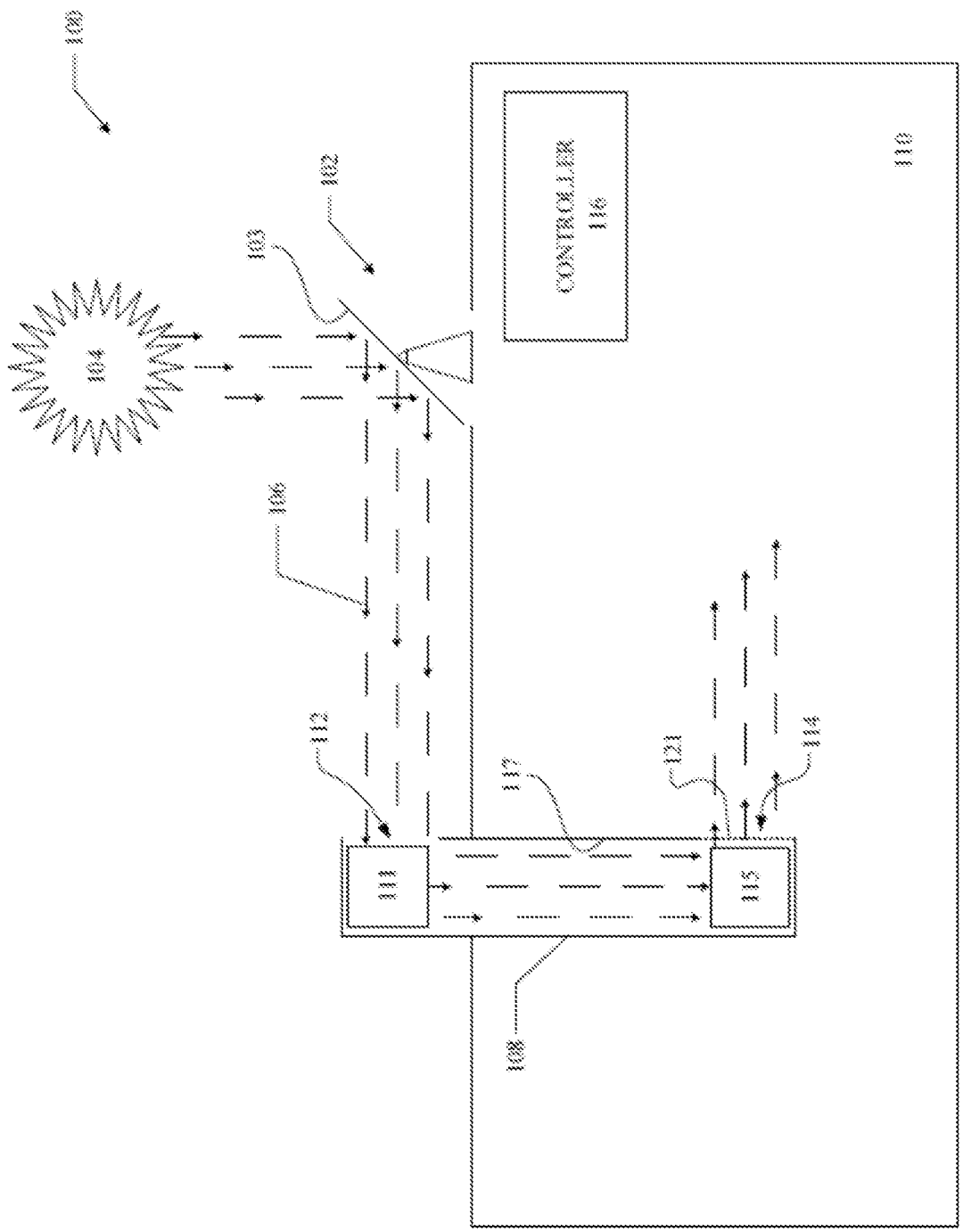
FIG. 1 is a cross-sectional view of an electromagnetic radiation collecting and directing apparatus.

Various technologies pertaining to directing electromagnetic radiation to illuminate and/or heat an area of a structure are discussed, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a," "an," and "the" as used in this application and the appended claims should generally be construed to mean "one or more" unless specified otherwise or clear from the context to be directed to a singular form. Further, as used herein, the term "exemplary" is intended to mean serving as an illustration or example of something and is not intended to indicate a preference.

With reference now to FIG. 1, a cross sectional view of an exemplary embodiment of an electromagnetic radiation collecting and directing apparatus 100 is illustrated. Electromagnetic radiation comprises many forms of energy such as visible light, infrared, ultraviolet, microwave, radio, etc. The particular embodiments disclosed herein are focused on natural light, however, other forms of electromagnetic radiation can also be used with the system and method disclosed herein. As used herein, the term "light" may be used to refer to both the illuminating qualities of light as well as the energy carrying qualities of light. The light-energy collecting and distributing apparatus 100 comprises a heliostat 102 that includes a reflective surface 103. In an example, the heliostat 102 is configured to track a light source 104 (e.g. a solar light source) by pivoting, via a motor such as a servo motor (not depicted), on an axel to direct light rays 106 of the light source 104 to a desired focus area. In an example, the heliostat 102 is configured to track the light source 104 and direct light rays 106 of the light source 104 to an optical device 111, such as a reflective surface or lens (e.g. a mirror, a prism, a Fresnel lens, a positive lens, or a negative lens). In another example, the heliostat 102 is positioned on an arm extending away from the structure, wherein the arm can be movable or fixed in space. In yet another example, the heliostat's 102 reflective surface 103 is parabolic in shape.

A heliostat, as described herein is device capable of moving to focus incident light by reflection or some other optical method on a predetermined target. Open source algorithms, e.g., under the MIT license, are available to operate and control a heliostat. Other algorithms, such as the Solar Position Algorithm for Solar Radiation Application (May 12, 2003) by the Measurement & Instrumentation Team at the Solar Radiation Research Laboratory of the National Renewable Energy Laboratory at Golden, Colo., are also available. These algorithms and variations thereof may be used to situate the focal point of sunlight based on the variable angle of incidence of the light reflected off a multiplicity of mirrors that are added and subtracted from an array so as to modulate the focal temperature and/or light intensity. Photo detectors and global positioning system (GPS) data can be employed in conjunction with such algorithms or variations thereof to adjust the heliostat's position to account for movements of the sun and changes in cloud cover. In some embodiments, algorithms that can trace the sun's position based on the device's determined GPS position can reduce the cost by eliminating the need for sensors to track the position of the sun.

In an embodiment, the apparatus 100 receives geographic location data regarding the location of the apparatus 100, e.g., position data (e.g. from a GPS), altitude data, and/or velocity data. This geographic location data can then be used in conjunction with existing astronomical data to direct a heliostat (e.g. the heliostat 102) or other reflective surface without the need to track the movements of the sun through ray tracing or light sensing.

While only a single heliostat 102 is depicted in this embodiment and others herein, this is done for simplicity of illustration. For most applications an array of heliostats 102 will be used to multiply the power of the incident radiation. In particular, in the claims "a heliostat" or "the heliostat" means "one or more heliostats." In embodiment, the reflective surface 103 of a heliostats 102 is from 6 inches in diameter (or width) to 10 feet in diameter (or width), such as 9 inches to 5 feet, or 1 foot to 3 feet. In an embodiment, the heliostat 102 has a reflective surface area of 0.20 square feet to 79 square feet, such as 0.45 to 20 square feet, or 0.78 square feet to 7.1 square feet.

The apparatus 100 further comprises a hollow shaft 108 that at least partially extends into a structure 110 (e.g. a building, a boat, an energy storage structure), wherein the hollow shaft 108 terminates in a first aperture 112 at a first end and a second aperture 114 at a second end. It is to be understood that the hollow shaft 108 can comprise multiple branches of hollow shafts with multiple apertures at the ends of said multiple branches. The first and second apertures 112, 114 mentioned herein are generally associated with an end of the shaft. Further, in an embodiment, an interior surface 117 of the hollow shaft 108 is configured to reflect light so as to minimize the amount of light dissipated via absorption into sides of the hollow shaft 108. The size of the hollow shaft 108 may be dependent upon the size of the structure 110. For example, if the structure 110 is large in size (e.g. a warehouse or an aircraft carrier) then the opening of the hollow shaft 108 may also be larger in size (e.g., 6 to 25 $ft^2$, 9 $ft^2$ to 15 $ft^2$, or 7 to 9 $ft^2$). If the structure 110 is small in size (e.g. a residential home or an apartment) the hollow shaft 108 may be smaller in size (e.g. 0.5 $ft^2$ to 5 $ft^2$, 1 to 4 $ft^2$, or 1.5 to 3 $ft^2$) or common ductwork sizes in residential units. The first aperture 112 is configured to receive the light rays 106 of the light source 104, optionally at the optical device 111. The second aperture 114 is open to an interior of the structure 110 and is configured to facilitate directing the received light rays 106 into an area within the structure 110. Optionally, a second optical device 115 directs the light into the structure 110 at or near the second aperture 114. The apparatus 100 further comprises a controller 116 wherein the controller is configured to receive user and/or sensor input and is in communication with the second aperture 114 or the first and/or second optical device 111, 115.

In an example, the heliostat 102 moves in response to movement of the light source 104, the movement of the heliostat 102 is such that the impinging light rays 106 of the light source 104 are continuously directed towards the first aperture 112 of the hollow shaft 108 throughout the day. The first aperture may comprise an optic lens such that the light rays 106 are altered as they enter into the hollow shaft 108 to be more or less focused, or to allow for a broader or narrower spectrum of light. The light rays 106 travel through the hollow shaft 108 until they arrive at the second aperture 114 where they are directed to an area within the structure 110. In an embodiment, the light rays 106 are focused into a focused beam to travel through the hollow shaft 108. In another embodiment, the interior of the shaft 108 is coated with reflective material and the light rays 106 reflect in and around the interior but are directed to the opposite terminal from which they entered.

In an embodiment, the second aperture may comprise an impeding device. For example, the second aperture may comprise a negative lens to defocus the light, a positive lens to focus the light, a transparent or semi-transparent material 121 to allow the light rays 106 to enter the area of the structure 110 while impeding air inside the area of the structure 110 from exiting the area of the structure 110 via the hollow shaft 108. In an embodiment, the transparent or semi-transparent surface may be tinted to change the hue of the light rays 106. In a further example, the light rays 106 may be directed through the second aperture 114 to heat up an area of the structure 110.

The apparatus 100 also comprises a controller 116 wherein the controller is configured to receive user and sensor input and is in communication with the second aperture 114.

In a particular embodiment of the general system shown in FIG. 1, multiple heliostats 102 focus light rays 106 from the exterior of the structure 110 to an optical device 111 at or near the first aperture 112 into a focused beam. The beam is focused to have a dimension that avoids hitting the interior surface 117 of the hollow shaft 108 but is not so focused as to overheat a small area. The beam is directed from the optical device 111 through the hollow shaft 108 to a second optical device 115 where the beam is reflected through the second aperture 114. In an embodiment, the second aperture disperses the beam, so that a high energy light and heat beam is dispersed widely, such as in an arc of 10 to 180 degrees, such as 20 to 150 degrees, or 45 to 90 degrees in any two dimensional plane, or three-dimensionally in a solid angle of 0.1 pi to 2 pi steradians, 0.5 pi to 1.5 pi steradians, or 0.7 pi to 1.3 pi steradians, when it exits the second aperture 114 into the structure 110.

In an embodiment, the beam is dispersed into an area at or near a ceiling of the structure 110, this provides not only heat but light to the area. In an embodiment, the beam may be dispersed from the second aperture 114 into a sub-floor area of the structure 110 with the light and heat impinging on an underside of a floor of the structure 110. In this embodiment, the beam can be used to provide heating to the floor of the structure 110 without light. This may be advantageous to provide only heat at night, when light is not desired.

In another embodiment, a heat sink, such as ceramic, stone, or a material with a high specific heat capacity (such as 1 to 4.5 kJ/(kg K), 1.2 to 4 kJ/(kg K), or 3 to 4 kJ/(kg K)) is set in or near the structure 110 in a vicinity of the second aperture 114 and the light beam is focused on it. In an embodiment, the material may be a decorative sculpture, such as a lighthouse or fire with both reflective and opaque portions.

In further embodiments, the hollow shaft 108 in any of the embodiments described herein may be replaced by a propagation medium (e.g. a prism, a fiber optic cable, a solid, a liquid). In such embodiments, the apertures described below may be replaced by ends of the propagation medium.

In an example, the propagation medium 108 is a silica-based prism, e.g. glass, the structure 110 is a vehicle, the first optical device 111 is a positive lens, and the interior area of the structure 110 is a liquid reservoir for a steam engine. A heliostat 102 directs electromagnetic radiation 106 into the positive lens 111 which focuses the light into an intensified beam that will propagate through the first termination 112 of the silica prism 108, wherein the silica prism directs the electromagnetic radiation towards a steam engine such that the electromagnetic radiation 106 boils the liquid of the steam engine such that energy via steam is generated. The steam energy can be converted to electricity for use in the structure or storage in batteries. The heliostat 102 can be in communication with a sensor (e.g. a geographic location sensor, an altitude sensor, or a light sensor), wherein input into the sensor controls a motor coupled to the heliostat 102. If the vehicle is moving, the sensor (not depicted) can track and follow the position of the light source 104 with respect to the heliostat 102 such that the motor can be controlled to continuously focus the heliostat 102 to direct the incident electromagnetic radiation 106 towards the first termination 112 of the propagation medium 108.

Figure 2:
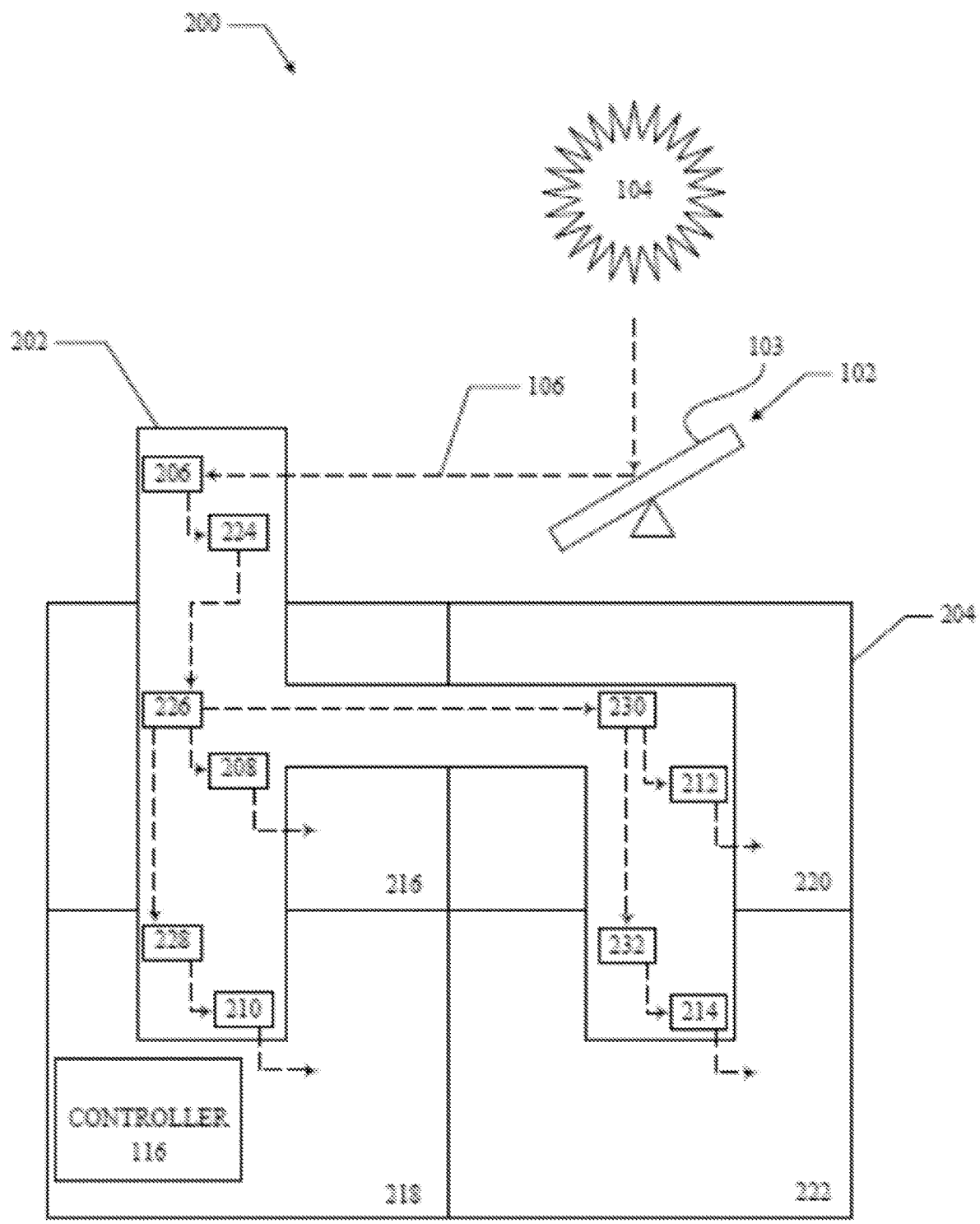
FIG. 2 is a cross sectional view of a multi area structure which is coupled to the electromagnetic radiation collecting and directing apparatus.

FIG. 2 depicts a cross sectional view of an exemplary embodiment of an electromagnetic radiation collecting and directing apparatus 200 that facilitates selecting one or more separate areas within a structure to direct light to. The apparatus 200 comprises the heliostat 102 which directs the light rays 106 from the light source 104 via the reflective surface 103 into a first aperture 206 of a hollow shaft 202, the hollow shaft 202 extends from an exterior into an interior of a structure 204. As depicted, the exemplary hollow shaft 202 may comprise diverging branches through which the light rays 106 may traverse via a series of optical devices 224, 226, 228, 230, 232. It is noted that the first optical device 224 may be positioned outside of the exemplary hollow shaft 202. It is to be further noted that the first optical device 224 may receive the light rays 106 prior to the first aperture 206, in such an embodiment, the first optical device 224 would direct the light rays 106 through the first aperture 206. The exemplary hollow shaft 202 further comprises a second aperture 208 corresponding to a first area 216 inside the structure 204, a third aperture 210 corresponding to a second area 218 inside the structure 204, a fourth aperture 212 corresponding to a third area 220 inside the structure 204, and a fifth aperture 214 corresponding to a fourth area 222 inside the structure 204. The apparatus 200 further comprises the controller 116, as described above, but which is in communication with all of the optical devices 224, 226, 230, 232.

In an exemplary embodiment, the heliostat 102 follows the light source 104 and directs the impinging light rays 106 into the first aperture 206 of the hollow shaft 202. The light rays 106 are directed through the hollow shaft 202 via the optical devices 224, 226, 228, 230, 232 to at least one of the second aperture 208, the third aperture 210, the fourth aperture 212, or the fifth aperture 214 wherein the light rays 106 may further be directed into the respective areas 216, 218, 220, 222 inside the structure 204.

The controller 116 is configured to direct the light rays 106 as they traverse through the hollow shaft 202. In the embodiment of FIG. 2, the controller 116 allows for the light rays 106 to enter through the first aperture 206 and traverse towards the second aperture 208 and third aperture 210 while restricting the light rays 106 from traversing towards the fourth aperture 212 and fifth aperture 214.

In an embodiment, on a cold and sunny day, the apparatus 200 of FIG. 2 receives light in the morning from the East and the optical devices 224, 226, 228 are controlled to direct light to the western side of the structure 204, e.g., the first and second areas 216, 218, thereby distributing light and heat to the shaded side of the structure 204. Then, in the evening, the optical devices 224, 226, 230, 232 are controlled to direct light to the eastern side of the structure 204, e.g., in the third and fourth areas 220, 222. On a hot day, the first optical device 224 is controlled to redirect the light so it does not enter the hollow shaft 202. Alternatively, the heliostat 102 is controlled to reflect the light away from the hollow shaft 202 or is controlled to point down and/or away from the sun. In an embodiment, even on a hot day, some or all of the light may be directed to an area for lighting, even if heat is not required.

In another exemplary embodiment, the controller 116 is configured to control impeding characteristics of the apertures 206, 208, 210, 212, 214, the impeding characteristics ranging in status from fully open to fully closed, or fully transparent to fully opaque. In an example, the controller 116 causes the impeding characteristics of the second aperture 208 and the fifth aperture 214 to be in a fully closed state, the impeding characteristics of the third aperture 210 to be in a partially closed/open state, and the fourth aperture 214 to be in a fully open state. Thus, the controller 116 restricts the light rays 106 from being directed into the first area 216 and the fourth area 222, partially allows for the light rays 106 to be directed into the second area 218, and fully allows for the light rays 106 to be directed into the third area 220. In a further example, the controller 116 can apply any combination of open or closed states to any of the apertures 206, 208, 210, 212, 214. In yet a further example, the controller 116 can direct the light in response to user and/or sensor input, such as a thermostat calling for more heat, a user adjusting a thermostat, a light sensor establishing the need for more or less light.

If light or heat is not needed in the structure, the heliostat 102 may be turned away from the light source, e.g. facing away from it, directly up, or directly down. Alternatively, the heliostat 102 could be moved to face a solar panel, or, as described below, a heat sink. In both cases, the light/heat energy redirected from the structure is stored and released later in the form of heat, steam, or electrical energy. Alternatively, the reflective surface 103 of the heliostat 102 is shuttered, such as with an opaque material. Shuttering may also occur to protect the reflective surface 103 from severe weather, e.g. hail.

In another example, the apparatus 200 can be interfaced and used in combination with pre-existing or conventional methods for heating and/or illuminating. In an embodiment, when the light source 104 is unavailable for an extended period of time, such that stored energy and/or available electromagnetic radiation is insufficient to provide heat and illumination demands to the structure 204, the structure 204 may revert to using energy provided from conventional means (e.g. a connection to an energy grid, or an alternative energy source that provides energy to lightbulbs, water boilers, or a heating, ventilation, and air conditioning (HVAC) system). In an embodiment, the apparatus 200 may be set up as a primary means to provide heat and/or light to the structure 204 while a conventional heating and/or lighting system may be set up as secondary means of providing heat and/or light. Conversely, a conventional heating and/or lighting system may be set up as the primary system with the apparatus 200 set up as the secondary system.

Further, the apparatus 200 may be used simultaneously with a conventional heating and/or lighting system. In a more specific embodiment, the apparatus at least partially shares ductwork with a conventional system, wherein the ductwork may be configured to allow the heating and/or lighting needs of a structure to be met by one of the apparatus 200, the conventional system, or a combination of the apparatus 200 and the conventional system. In an embodiment, the ductwork may also function and be configured as a portion of the hollow shaft 202. In another embodiment, the apparatus 200 and a conventional system may divide HVAC responsibilities e.g., the apparatus may provide heating needs of a structure while a conventional system may provide ventilation and air conditioning needs.

In yet another example, specific wavelengths of the electromagnetic radiation may be filtered by an optical device such that only desired wavelengths are admitted. In an embodiment, certain electromagnetic wavelengths can be filtered for various purposes, such as to filter out wavelengths outside of a useful spectrum. Other wavelengths may be filtered to prevent or reduce the risk of radiation overexposure to people, such as sunburn.

Figure 3:
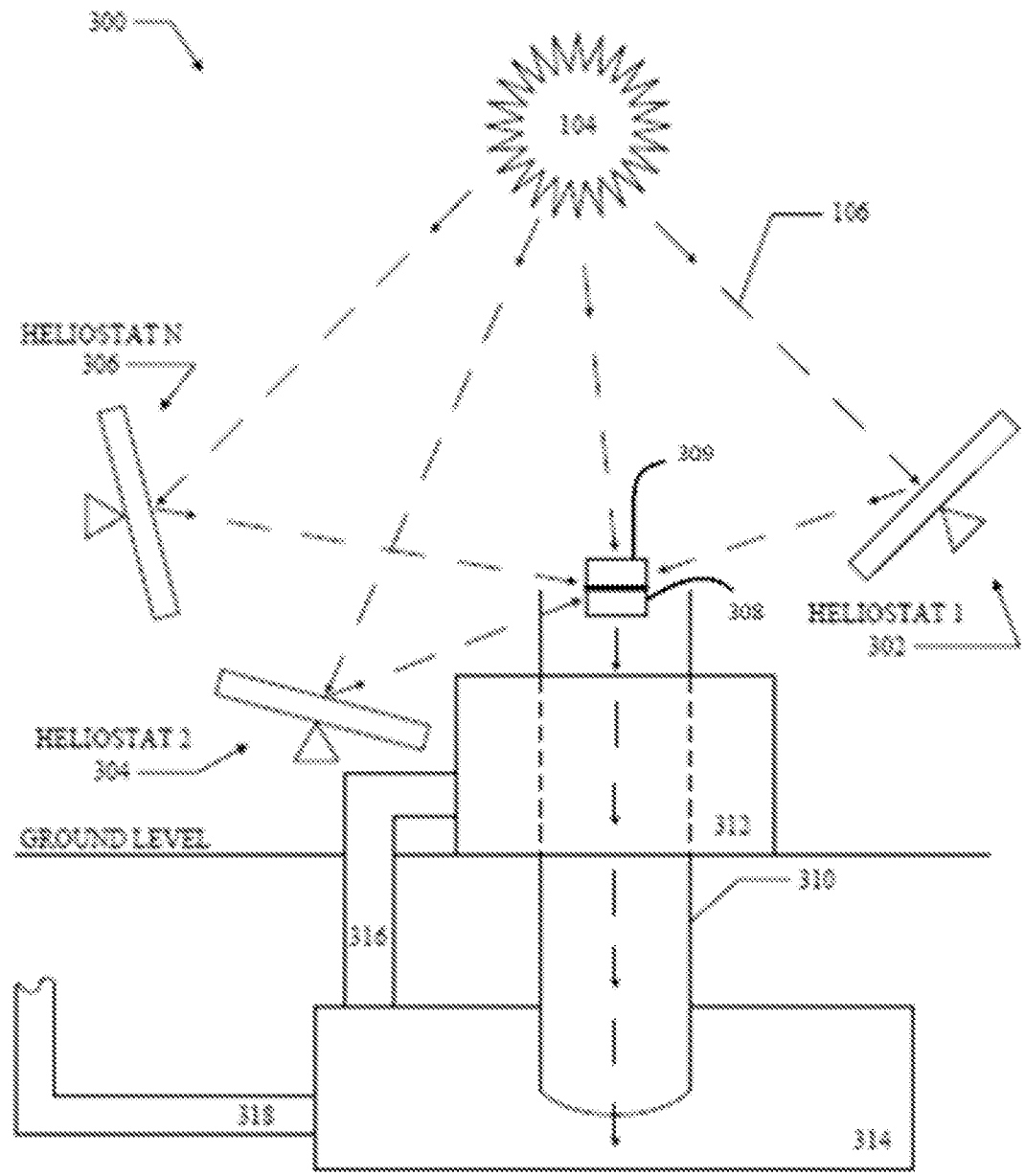
FIG. 3 is a cross sectional view of an embodiment of the electromagnetic radiation collecting and directing apparatus used in conjunction with an energy storage device.

With reference now to FIG. 3, a cross sectional view of an exemplary embodiment of an electromagnetic radiation collecting and directing apparatus 300 with an energy storage application is depicted. A light source 104 such as the sun provides light rays 106. The apparatus 300 comprises a plurality of heliostats 302, 304, 306 configured to direct light to an optical device 308 at or near a first aperture 309 of a hollow shaft 310. The hollow shaft 310 may be coupled to a structure 312 and facilitates directing the light to a thermal energy storage device 314, which the hollow shaft 310 is coupled to or in optical communication with. In an embodiment, the interior of the hollow shaft 310 comprises a reflective material to minimize dissipating electromagnetic radiation into the hollow shaft 310. In an embodiment, the optical device 308 directs light to the thermal energy storage device without the use of a hollow shaft 310.

The thermal energy storage device 314 is configured to receive the light rays 106, store initial energy of the light rays 106 as thermal energy, and distribute the thermal energy at a future time from when the thermal energy was stored. The thermal energy storage device 314 includes a thermal energy storage medium that has a high specific heat capacity (such as 1 to 4.5 kJ/(kg K), 1.2 to 4 kJ/(kg K), or 3 to 4 kJ/(kg K). A liquid such as water may be advantageous in certain embodiments as the thermal energy storage medium. The thermal energy storage device, may, for example, be a concrete container buried underground and filled with water. Advantageously, the thermal energy storage device is surrounded by insulating material, such as earth, as shown in FIG. 3.

The thermal energy storage device 314 is further configured to distribute the thermal energy directly to the structure, such as through a duct or to devices of the structure requiring energy via a first energy distribution medium 316, and/or to external functions requiring energy via a second energy distribution medium 318. The heat may be distributed through a blower to circulate hot air, or through a water circulation system to circulate hot water, such as a heat exchanger that transmits the heat to a solid for radiant (e.g. floor) heating or transmits the heat to air for forced air heating.

In an embodiment, a temperature sensor in the thermal energy storage device sense the temperature and signals a controller when a threshold temperature is reach, thereby causing further heating to stop, such as by moving the heliostats to focus the light rays away from the thermal energy storage device 314. At a threshold minimum temperature the sensor signals the controller to refocus the light rays on the thermal energy storage device 314. In an embodiment, the thermal energy storage device may be integrated with a system designed for geothermal heating. In an embodiment, the light rays may be directed to an energy storage device and the temperature is allowed to be raised to the boiling point of the storage medium, in the thermal energy storage device 314.

In another exemplary embodiment, the thermal energy storage device 314 is on a movable structure (not depicted), such as a sea vessel, e.g., a shipping vessel, a military ship, or a cruise ship, or a flying vessel, e.g., a balloon, blimp, or dirigible. In one embodiment, a ship with multiple levels comprises the thermal energy storage device 314 (e.g. a salt water tank). The thermal energy storage device 314 is configured to receive light rays 106 from a light source 104 (e.g. the sun). The light rays 106 are directed to the thermal energy storage device 314 which then distributes the thermal energy via pipes (e.g. the first energy distribution medium 316) positioned on the different levels of the ship. In a flying vessel embodiment, the apparatus directs light to an energy store where steam or hot air or gas is generated and directed into an air or gas bag of the flying vessel.

Figure 4:
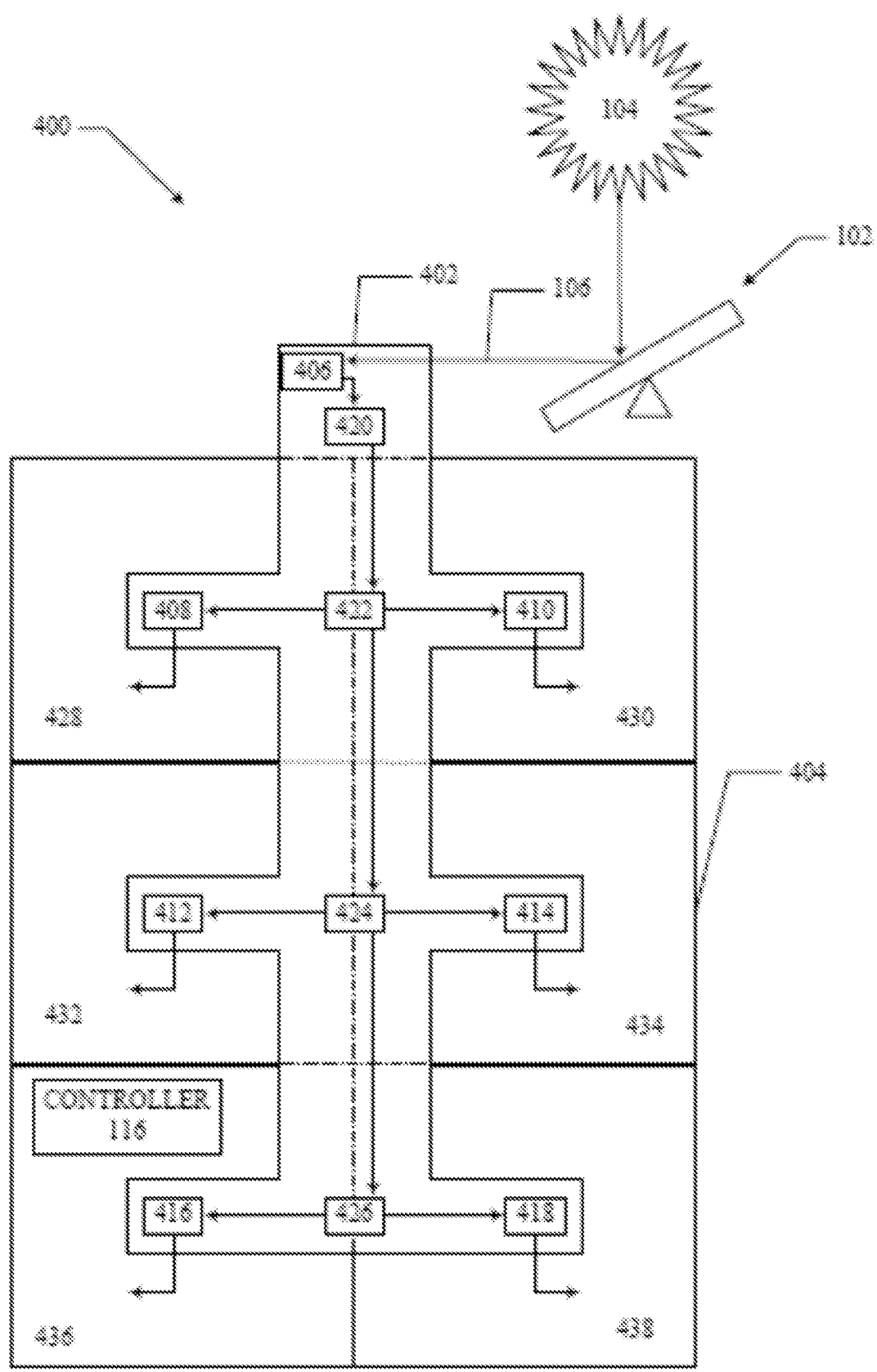
FIG. 4 is a cross-sectional view of an embodiment of the electromagnetic radiation collecting and directing apparatus coupled to a multi-level structure.

With reference now to FIG. 4, a cross sectional view of another exemplary embodiment of an electromagnetic radiation collecting and directing apparatus 400 is depicted. The apparatus 400 is applied to a structure with multiple levels. The apparatus 400 comprises a hollow shaft 402, which may be coupled to a structure 404 with a plurality of levels, e.g. a multi-story building, a multi-level boat, or a multi-level bunker for storing energy. The exemplary apparatus 400 further comprises the heliostat 102 which directs the light rays 106 from the light source 104 to a first aperture 406 of the hollow shaft 402, the light rays 106 further being received by a first optical device 420. Alternatively, the first optical device 420 may be positioned outside of the hollow shaft 402 such that the heliostat 102 may direct the light rays 106 to the first optical device 420 which further directs the light rays 106 through the first aperture 406 of the hollow shaft 402. The exemplary apparatus 400 further comprises a second aperture 408 corresponding to a first area 428 of the structure 404, a third aperture 410 corresponding to a second area 430 of the structure 404, a fourth aperture 412 corresponding to a third area 432 of the structure 404, a fifth aperture 414 corresponding to a fourth area 434 of the structure 404, a sixth aperture 416 corresponding to a fifth area 436 of the structure 404, and a seventh aperture 418 corresponding to a sixth area 438 of the structure 404. The exemplary apparatus 400 further comprises a second optical device 422, a third optical device 424, a fourth optical device 426, and the controller 116. The controller 116 can be configured to control the optical devices 420, 422, 424, 426.

In this embodiment, the heliostat 102 directs the light rays 106 from the light source 104 to the first aperture 406 wherein the light rays are then received by the first optical device 420. The controller 116 controls the first optical device 420 to directs the light rays 106 to the second optical device 422. The controller 116 controls the second optical device 422 to direct the light rays 106 to at least one of the third optical device 424, the second aperture 408, or the third aperture 410. The controller 116 controls the third optical device 424 to direct the light rays 106 to at least one of the fourth optical device 426, the fourth aperture 412, or the fifth aperture 414. The controller 116 controls the fourth optical device 426 to direct the light rays 106 to at least one of the sixth aperture 416 or the seventh aperture 418.

If no light is desired for a time period, it is contemplated that the heliostat 102 can direct the light rays 106 away from the first aperture 406, away from the first optical device 420, and/or at the ground. Also, the controller 116 can control the optical devices 420, 422, 424, 426 to direct the light rays 106 away from certain apertures and/or between apertures 420, 422, 424, 426. For example, the controller 116 may control optical devices 420, 422, and 424 such that the light rays 106 are directed towards the second aperture 408, and the fourth aperture 412, but not the third, fifth, sixth, and seventh apertures 410, 414, 416, 418. The controller 116 can be configured to provide multiple directions of light within the exemplary apparatus 400.

Figure 5:
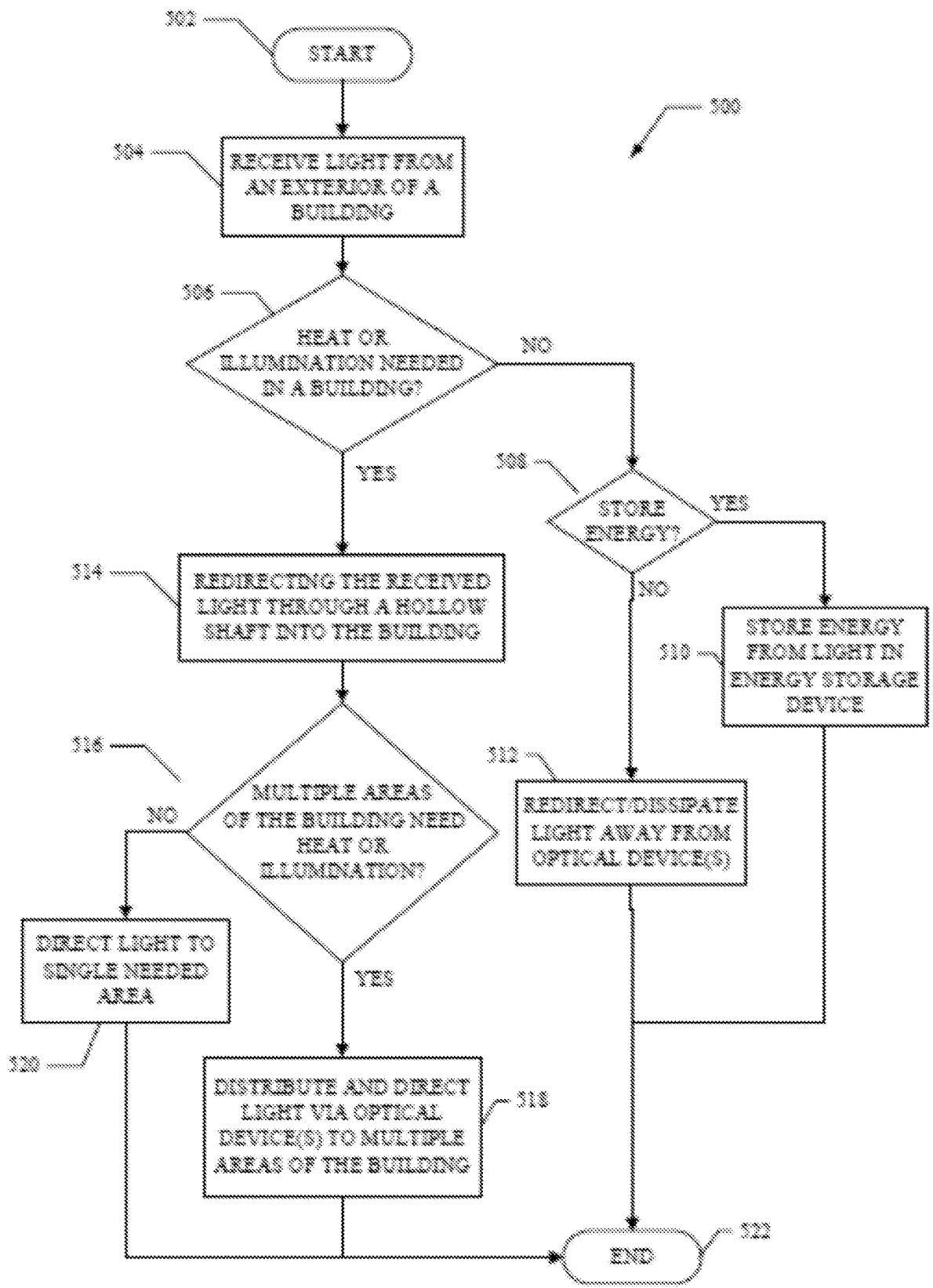
FIG. 5 is an exemplary method flow chart depicting actions taken by the electromagnetic radiation collecting and directing apparatus.

With reference now to FIG. 5, an exemplary method 500 flow chart for operation of the electromagnetic radiation collecting and directing apparatus (the apparatus) is depicted. The method 500 starts at 502, and at 504 the apparatus receives light from an exterior of a building. The received light may be directed into the apparatus via a heliostat of the apparatus. At 506, the apparatus, e.g., through a controller, determines whether or not there is a need for heat or illumination in a building. The controller may, for example, include a processor coupled to a user input device or sensor input device configured to accept input for heat or illumination (e.g. adjustment to a thermostat, sensor based control). If heat or illumination is not required, at 508 the apparatus checks whether or not there is a need to store the energy from the received light (e.g., receiving instructions form a controller to store energy, being configured by default to store energy). At 510, if there is a need to store the energy, the apparatus stores the energy in an energy storage device (e.g., a heat sink, a salt water tank, or other thermal energy storage device), otherwise at 512, the light is redirected and/or dissipated away from the optical device(s) of the apparatus. In an embodiment, the light is directed to a heat exchanger and the heat exchanger transfers heat to the energy storage device. If the apparatus is not equipped with an energy storage device then the apparatus will redirect and/or dissipate the light away from the optical device if heat or light is not needed in the structure.

If there is a need for heating or illumination in a structure, at 514 the received light is then redirected through a hollow shaft into the structure. At 516 the apparatus checks whether or not there is a need for heat or illumination in multiples areas of the structure. If there is a need to heat or illuminate multiple areas of the structure then at 518 the apparatus distributes and directs the light via optical device(s) to multiple areas of the structure. The method 500 ends at 522.

Figure 6:
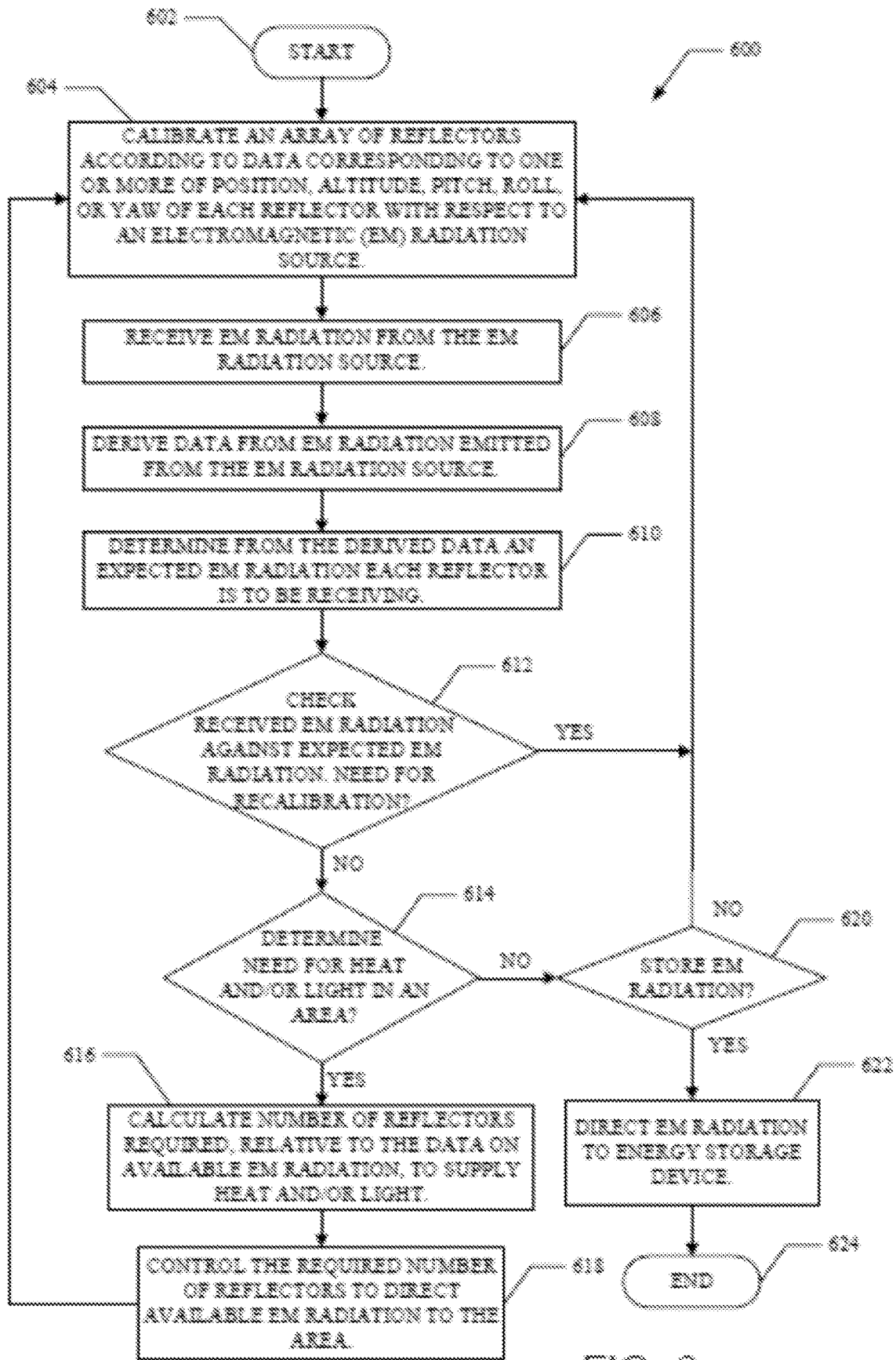
FIG. 6 is an exemplary method flow chart depicting controlling an array of reflectors.

With reference now to FIG. 6, an exemplary method 600 flow chart for operation of the electromagnetic radiation collecting and directing apparatus (the system) comprising an array of reflectors (heliostats) is depicted. The method 600 starts at 602, and at 604 the system calibrates an array of reflectors according to data corresponding to one or more of position, altitude, pitch, roll, or yaw of each reflector with respect to an electromagnetic (EM) radiation source. At 606, the system receives EM radiation from the EM radiation source. At 608, the system derives data from the received EM radiation emitted from the EM radiation source. At 610, the system analyzes the data derived from the received EM radiation as well as information on the current calibration of each reflector and determines an expected amount of EM radiation that each reflector should receive.

At 612, the system determines whether there is a need for recalibrating one or more reflectors by checking the received EM radiation against the expected EM radiation. If calibration is needed, the method repeats from 604. At 614, if there is no need for recalibration, the system determines if there is a need for heat and/or light in an area. At 616, if it is determined that there is a need for heat and/or light in an area, the system calculates a number of reflectors that is required, relative to the data on the available EM radiation, to supply heat and/or light to the area. At 618, the system controls (e.g. shuttering, focusing, directing) the required number of reflectors to direct the available radiation to the area. The method then repeats from 604.

If after 614, it is determined that there is no need for heat and/or light in an area, or less of a need for heat and/or light than is available, then at 620, the system determines if the received and unused EM radiation is to be stored. If storage of the EM radiation is not needed, the methods continues by restarting from 604. If after 620 it is determined that storage of the EM radiation is needed, then at 622 the system directs the EM radiation to an energy storage device. The method ends at 624.

Figure 7:
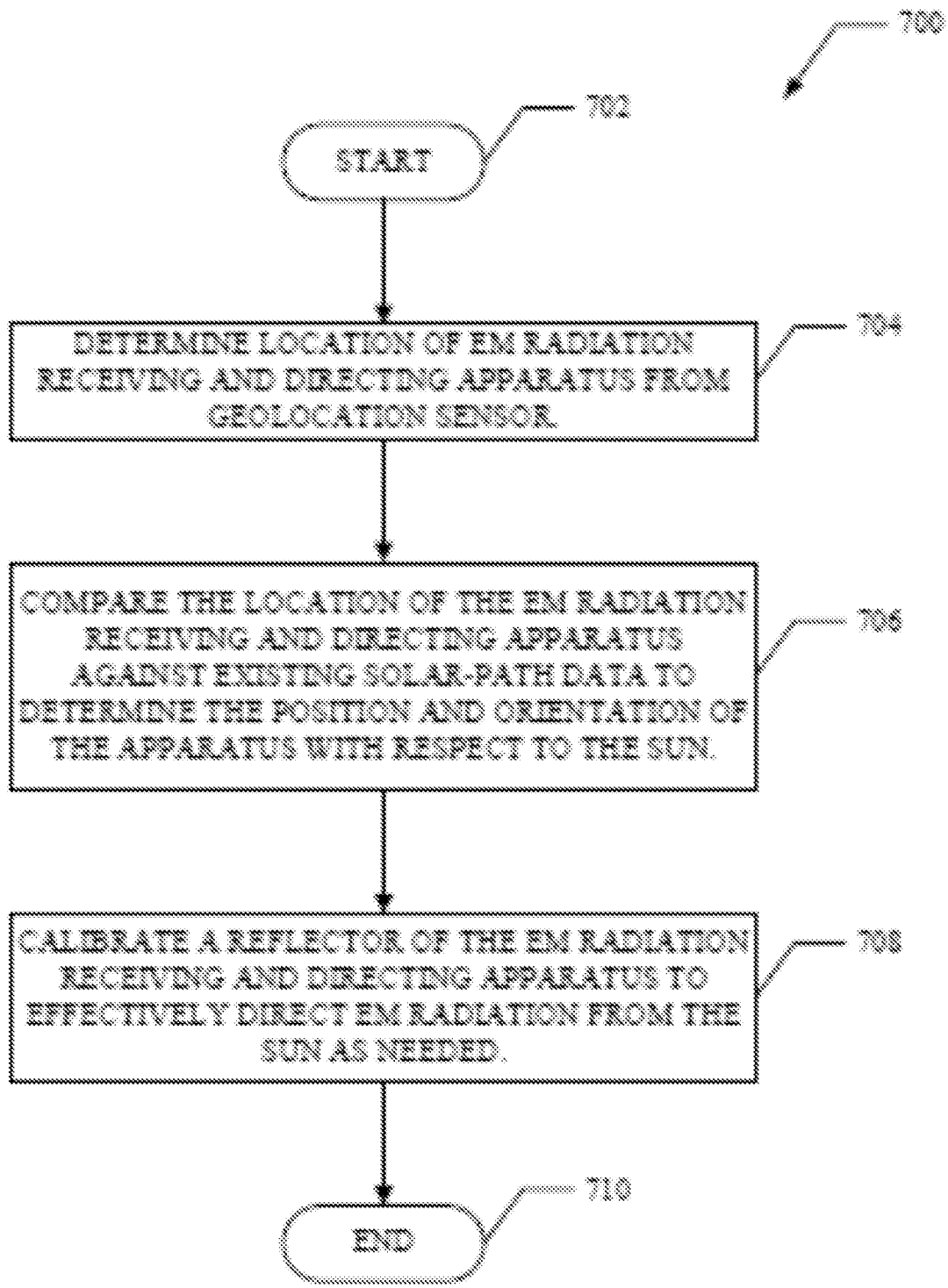
FIG. 7 is an exemplary method flow chart depicting controlling reflectors without a light sensor.

With reference now to FIG. 7, an exemplary method 700 for calibrating and operating a reflector system without the use of light sensors or real-time sun tracking is depicted. The method 700 starts at 702, and at 704 a geolocation sensor (e.g., a GPS sensor, a position sensor, and/or an altitude sensor) is used to determine a location of the EM radiation receiving and directing apparatus (the apparatus). From the determined location of the apparatus, a location of a particular reflector or array of reflectors of the apparatus can be determined based on a predetermined distance and location that a reflector is from the geolocation sensor. It is also envisioned that there may be a multitude of geolocation sensors corresponding to a multitude of reflectors. At 706, a computing device in network communication with the apparatus is used to compare the location of the apparatus against existing solar-path data to determine the position and orientation of the apparatus with respect to the sun. At 708, a controller in network communication with the computing device uses the determined position and orientation of the apparatus to calibrate one or more reflectors of the apparatus to effectively direct EM radiation from the sun to the apparatus as needed. For instance, it may be determined that only a fraction of the available EM radiation that can be reflected is needed, as such, the controller may calibrate at least one reflector to not reflect the EM radiation to the apparatus. The method 700 ends at 710.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Furthermore, to the extent that the term "includes" is used in either the detailed description or the claims, such term is intended to be inclusive in a manner similar to the term "comprising" as "comprising" is interpreted when employed as a transitional word in a claim. The term "consisting essentially" as used herein means the specified materials or steps and those that do not materially affect the basic and novel characteristics of the material or method. If not specified above, any properties or measurements mentioned herein may be determined by applicable ASTM standards, or if an ASTM standard does not exist for the property, the most commonly used standard known by those of skill in the art may be used. The articles "a," "an," and "the," should be interpreted to mean "one or more" unless the context indicates the contrary.

It is claimed:

1. A controller managed method of capturing and modulating electromagnetic radiation and redirecting it to a structure, the method comprising:
    receiving input data from a sensor relative to available electromagnetic radiation that is external to the structure and available for reflection by an array of reflectors;
    analyzing data relating to a demand for electromagnetic radiation, the demand generated by user or sensor input;
    directing the available electromagnetic radiation to an optical device at a terminal end of a hollow shaft extending at least partially into the structure
    managing one or more optical devices to modify and/or redirect the electromagnetic radiation; and
    redirecting the modulated electromagnetic radiation to an energy storage device, the energy storage device configured to receive and store the modulated electromagnetic radiation as thermal energy;
    wherein the controller varies alignment and/or number of reflectors to modulate varying amounts of available electromagnetic radiation;
    wherein the energy storage device is configured to store hot air or gas.

2. The method of claim 1, wherein the controller varying of the alignment and/or number of reflectors is done by shuttering or turning the reflector to change the angle of reflection.

3. The method of claim 1, wherein the modulated electromagnetic radiation is directed to a propagating medium which at least partially extends into a structure, wherein the propagating medium comprises a first end and a second end.

4. The method of claim 1, further comprising: redirecting the modulated electromagnetic radiation within the structure to first and second terminal apertures within the structure.

5. The method of claim 1, wherein the hollow shaft extends at least partially into the structure.

6. The method of claim 1, wherein the energy storage device is on a movable structure.

7. The method of claim 1, further comprising distributing the stored thermal energy to a heat exchanger.

8. The method of claim 1, wherein the energy storage device is on a balloon, blimp, or dirigible.

9. The method of claim 1, further comprising transmitting heated air through ductwork.

10. A computer-implemented method utilizing an algorithm to reflect electromagnetic radiation in a structure, the steps of which comprise:
    controlling a focal point of electromagnetic radiation incident on an array of mirrors based on a variable angle of incidence of electromagnetic radiation reflected from the array of mirrors;
    modulating a focal temperature and/or electromagnetic radiation intensity of the reflected electromagnetic radiation by adding or subtracting one or more mirrors directed to the focal point from the array of mirrors;
    distributing the reflected electromagnetic radiation in response to user or sensor input to an energy storage device to store thermal energy; and
    utilizing the stored thermal energy in an engine.

11. The method of claim 10, wherein the adding or subtracting of one or more mirrors is done by shuttering or turning the mirror to change the angle of reflection.

12. The method of claim 10, further comprising directing the reflected electromagnetic radiation onto a surface within the structure until further user or sensor input is received by a controller, thereby heating an area of the structure to a desired temperature.

13. The method of claim 10, wherein the reflected electromagnetic radiation is directed to an area of the structure that is shaded from the sun until a preset temperature is reached, then directing the reflected electromagnetic radiation away from the shaded area.

14. The method of claim 12, wherein when the further user or sensor input is received, instead of heating the area of the structure, storing thermal energy of the reflected electromagnetic radiation in the thermal energy storage device and providing the stored thermal energy at a later time to an area of the structure.

15. The method of claim 10, redirecting the reflected electromagnetic radiation to a thermal energy storage device, the thermal energy storage device configured to receive and store the reflected electromagnetic radiation as thermal energy, and distribute the stored thermal energy at a future time from when the thermal energy was stored.

16. The method of claim 10, wherein the stored thermal energy is converted to electricity.

17. The method of claim 10, further comprising filtering out certain wavelengths of the electromagnetic radiation.

18. A system comprising:
- a propagating medium which at least partially extends into a structure, wherein the propagating medium comprises a first end and a second end;
- an optical device associated with the propagating medium;
    - wherein the first end is configured to receive electromagnetic radiation from a heliostat or optical device;
    - wherein the second end is configured to allow the received electromagnetic radiation to exit the propagating medium;
- a controller;
    - wherein the controller is configured to control a direction and amount of the received electromagnetic radiation via at least one of user input or sensor input; and
- wherein the propagating medium comprises ductwork or is coupled to ductwork, the ductwork also being associated with a conventional heating and/or cooling system.

19. The system of claim 18, wherein the propagating medium is the ductwork and the ductwork includes within it the optical device.

20. The system of claim 19, wherein the ductwork is configured to provide a heating need of a structure to be met by one or both of the electromagnetic radiation or the conventional heating and/or cooling system.

21. The system of claim 19, wherein a portion of the electromagnetic radiation is directed to an energy storage medium.

22. The method of claim 1, wherein the hollow shaft is coupled to the energy storage device.

* * * * *